(12) United States Patent
Buechi et al.

(10) Patent No.: US 7,645,530 B2
(45) Date of Patent: Jan. 12, 2010

(54) METHOD AND APPARATUS FOR HUMIDIFICATION OF THE MEMBRANE OF A FUEL CELL

(75) Inventors: Felix Buechi, Langenthal (CH); Martin Ruge, Starrkirch-Wil (CH); Daniel Schmid, Winterthur (CH)

(73) Assignee: Paul Scherrer Institute, Villigen (CH)

( * ) Notice: Subject to any disclaimer, the term of this patent is extended or adjusted under 35 U.S.C. 154(b) by 75 days.

(21) Appl. No.: 11/903,171

(22) Filed: Sep. 20, 2007

(65) Prior Publication Data
US 2008/0182140 A1    Jul. 31, 2008

Related U.S. Application Data

(63) Continuation of application No. 10/608,088, filed on Jun. 30, 2003, now abandoned.

(51) Int. Cl.
*H01M 8/04* (2006.01)
*H01M 8/10* (2006.01)
(52) U.S. Cl. .............. 429/13; 429/30; 429/34
(58) Field of Classification Search .......... 429/13, 429/17, 30, 34
See application file for complete search history.

(56) References Cited

U.S. PATENT DOCUMENTS 4,973,530 A * 11/1990 Vanderborgh et al. ......... 429/13
2002/0058168 A1 * 5/2002 Voss et al. .................... 429/13

* cited by examiner

*Primary Examiner*—Gregg Cantelmo
(74) *Attorney, Agent, or Firm*—Laurence A. Greenberg; Werner H. Stemer; Ralph E. Locher

(57) ABSTRACT

A fuel cell has an electrochemical process area having a cathode area, an anode area and an ion-exchanging membrane that separates these areas. The cathode area has a gas passage way having a gas inlet, a gas channel and a gas outlet, wherein the gas passage way is for an oxygen-containing gas to flow from the gas inlet through the gas channel to the gas outlet. The fuel cell includes further a humidity transfer area having a dehumidifying zone, a humidifying zone and a humidity transfer membrane that separates these zones. An exhaust channel connects the gas outlet to the dehumidifying zone, and an inlet channel connects the gas inlet to the humidifying zone. Humidity is extracted from the oxygen-containing gas in the dehumidifying zone, and added to the oxygen-containing gas in the humidifying zone via the humidity transfer membrane.

8 Claims, 3 Drawing Sheets

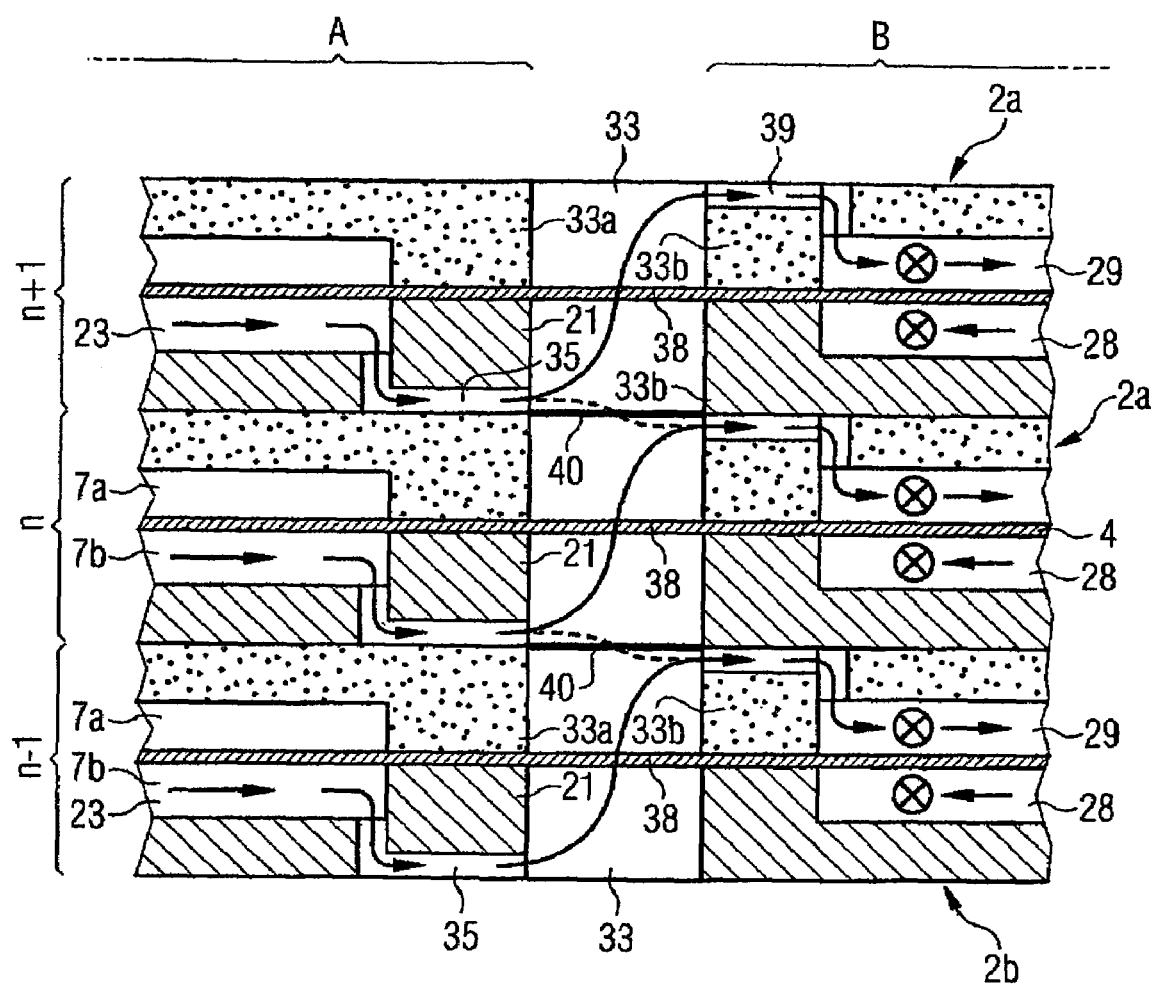

METHOD AND APPARATUS FOR HUMIDIFICATION OF THE MEMBRANE OF A FUEL CELL

CROSS-REFERENCE TO RELATED APPLICATION

This application is a continuation of U.S. patent application No. 10/608,088, filed Jun. 30, 2003, now abandoned.

BACKGROUND OF THE INVENTION

The present invention relates to a method and an apparatus for exchanging humidity between the fuels in a fuel cell. A fuel cell has a stack-like structure with an electrolyte arranged between end plates. Between the electrolyte and one end plate is an anode, and between the electrolyte and the other end plate is a cathode. Solid and liquid electrolytes are known; as the case may be, the electrolyte can be absorbed by a carrier structure or itself possesses the requisite solidity enabling it to be used in the cell. The operating temperatures also differ considerably and vary from ambient temperature to several hundred degrees C. and above.

It is customary to combine individual fuel cells to form a fuel cell stack, in order to obtain the desired operating voltage by connecting a suitable number of individual cells in series.

In one of the many known structural forms to which the invention can be applied, a polymer electrolyte membrane (PEM) is used in the fuel cell. In operation the fuel cell is then supplied on the anode side with e.g. hydrogen in gaseous form and on the cathode side with e.g. ambient air containing oxygen. The hydrogen and oxygen are used here by way of a non-limiting example.

In the present case for the sake of simplicity all reaction partners which participate in the chemical reaction in a fuel cell are designated as fuels, as are their carrier fluids (e.g. ambient air as a carrier fluid for the reaction partner $O_2$). The fuels are present in fluid form.

In the presence of a catalytic converter, e.g. platinum, the hydrogen molecules split into protons and electrons, while on the cathode side oxygen molecules absorb electrons and are ionized into $O^{2-}$ ions. Since the membrane is designed as a proton conductor, the protons formed on the anode side diffuse through the membrane to the cathode; the electrons are supplied to the cathode via a separate electrical conductor, with an electrical load being inserted. The protons and oxygen ions react there to become water.

The protons are transported in the membrane in the form of $H_3O^+$ ions; this is dependent upon the appropriate water content of the membrane. With a higher water content the ability of the membrane to conduct protons improves. The degree of operationally necessary humidity is therefore predetermined by the person skilled in the art, taking into account the parameters of the fuel cell and characteristics of the membrane.

If the humidity is not substantially constant across the membrane, the fuel cell cannot be kept at an optimum operating point; areas of the membrane which are too dry reduce the production of current, since dryness makes it more difficult for protons to be transported through the membrane.

In operation, the membrane continuously loses humidity, since as stated above, the protons are transported through the membrane via $H_3O^+$ ions. Furthermore, water is produced on the cathode side. In this way the air flow on the cathode side continuously becomes charged with humidity on its route across the membrane. In the area of the inlet, the air flow which is not as yet charged with humidity helps the membrane to dry out, while in the area of the outlet it tends to have excess humidity (condensation).

As a result, the membrane is too dry on the inlet side, which as mentioned above is undesirable. If a fuel cell stack continues to be operated, the overly dry parts of the membrane of a fuel cell generate resistance via a corresponding production of heat, which, in turn, accelerates the drying out process. This leads to a significant reduction in cell output, overheating, and even destruction of the affected cell.

Humidity refers not only to the presence of water. Just as the term "fluids" is used here to refer to all possible fuels, "humidity" refers to any substance which in the case of a given membrane (and given fuels) permits charges (such as protons in the case of PEM membranes) to be transported through the membrane.

U.S. Pat. No. 4,973,530 discloses a method for regulating the humidity content in a fuel cell membrane by continuous addition of externally supplied water into the anode area and by continuous removal of humidity on the cathode side. For the addition of water a further membrane which is pervious to water is arranged next to the membrane of the fuel cell and the channel for the hydrogen is arranged in such an alternating pattern that it is routed back and forth in a zigzag fashion first via the membrane of the fuel cell, then via the water-pervious membrane, until both membranes are fully covered and the residual hydrogen can be expelled to the outside. A further, also water-pervious membrane is used to remove humidity from the cathode area with the same zigzag routing arrangement, in that a dry gas is routed over the further membrane, absorbs the humidity to be discharged, and expels it to the outside.

It is further proposed to use hydrogen as a dry gas which is to be supplied to the anode area, with the advantage that the hydrogen then already contains a certain humidity before entering the area of the membrane of the fuel cell. To construct a stack of fuel cells it is proposed to create common supply and discharge channels routed through the stack for all anode-side and cathode-side areas, including the areas conveying water (for humidification) or a dry gas (for dehumidification), in that the same fluid-conveying lines are connected together through correspondingly cut holes in the membranes.

It is now the object of the present invention to provide an improved fuel cell or a stack of fuel cells with controlled humidity management.

SUMMARY OF THE INVENTION

The present invention relates to a system and method for humidity management in a fuel cell. The present invention is advantageous because humidity is removed from the fluid flow expelled from the cathode area and is added to the fluid flow which flows into the cathode area, a simple humidity circuit is produced which can be achieved without any greater construction effort and in particular does not require any further external gas or water circuits, as is the case in the above-cited prior art. Sufficient humidity needs only to be added to the fluid flowing into the cathode area as is necessary to keep the cathode-side inlet area of the electrolyte membrane above a critical humidity. Excess humidity can be expelled to the outside with the outflowing fluid. The same applies for the anode area. In the context of the invention both the cathode area and the anode area may be dehumidified.

If a stack of fuel cells is formed from a plurality of fuel cells, it is customary to provide the individual fuel cells with common supply and discharge channels for the fuels, said channels running along or through the stack. Arrangements are preferred in which the supply and discharge channels terminate jointly at one end of the stack, the cathode-side connection of the respective fuel cell to the humidity exchanger associated therewith being kept separate from the same connections of adjacent fuel cells. Only the dehumidified fluid expelled from the humidity exchanger is fed back into the discharge channel common to all fuel cells.

As a result, not only is the drop in pressure the same for each fuel cell in the fuel cell stack on the cathode side over the inlet in front of and the outlet after the humidity exchanger, but the volume flow or mass flow of fuels is also the same, so that the production of current is the same for each of the fuel cells in the stack. This is of great importance, since otherwise comparatively low current-producing fuel cells have to be powered by the rest of the stack, thereby reducing the efficiency of the stack.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawing, wherein:

FIG. 4 depicts a cross-section through a part of a fuel cell stack according to the present invention, in schematic form.

DETAILED DESCRIPTION OF THE INVENTION

Figure 1:
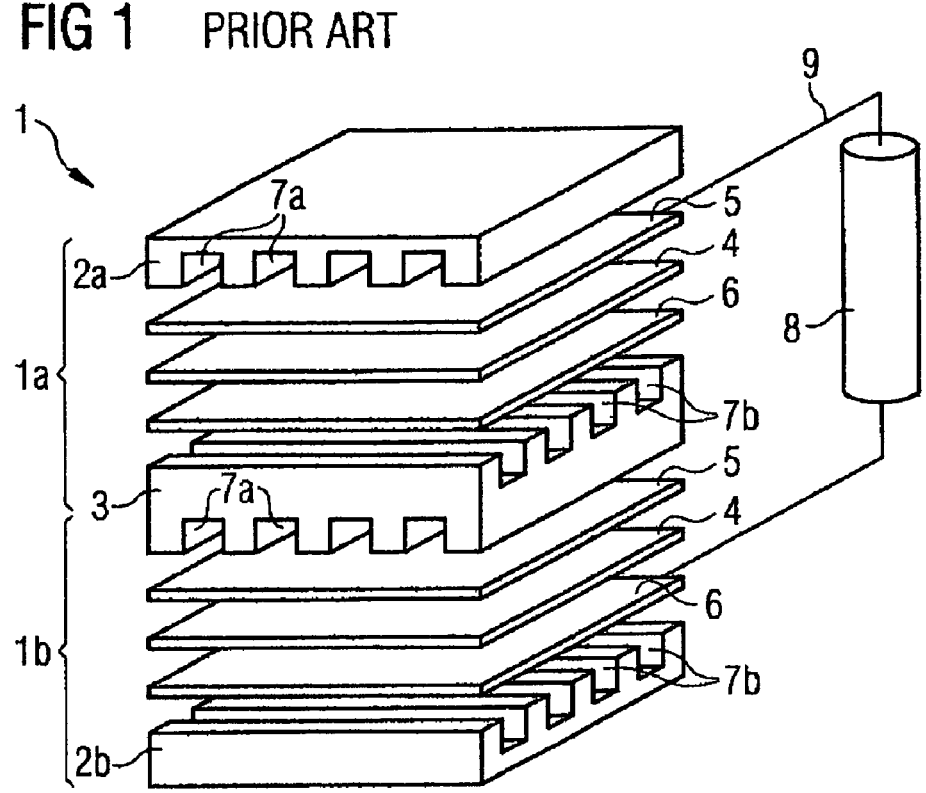
FIG. 1 depicts a fuel cell stack according to the prior art, in schematic form.

FIG. 1 depicts schematically and by way of example a stack 1 of fuel cells formed from two PEM fuel cells 1a and 1b. The fuel cell stack 1 may comprise many fuel cells, with stacks having approximately 100 fuel cells being common. The present invention may also be applied to other than PEM fuel cells. Each fuel cell 1a, 1b further comprises end plates 2a, 2b, with the adjacent end plates of the cells 1a, 1b here being combined to form a bipolar plate 3. The fuel cells 1a, 1b of the stack 1 are constructed in the same way: between the end plates 2a or 2b and the bipolar plate 3 is a polymer electrolyte membrane 4 in each of the cells 1a and 1b. On opposite sides of membrane 4, i.e. on the side of the end plates 2a or 2b and on the side of the bipolar plate 3, an anode 5 or a cathode 6 is arranged. Channels 7a, 7b are used to supply gaseous fuels, in this case on the anode side $H_2$, or a fluid containing $H_2$ (channels 7a) and on the cathode side $O_2$ or ambient air or another fluid containing $O_2$ (channels 7b). It is known in principle in the prior art for the channels 7a and 7b to be designed such that the transported fluids can be supplied as evenly as possible to the whole membrane surface.

Figure 2:
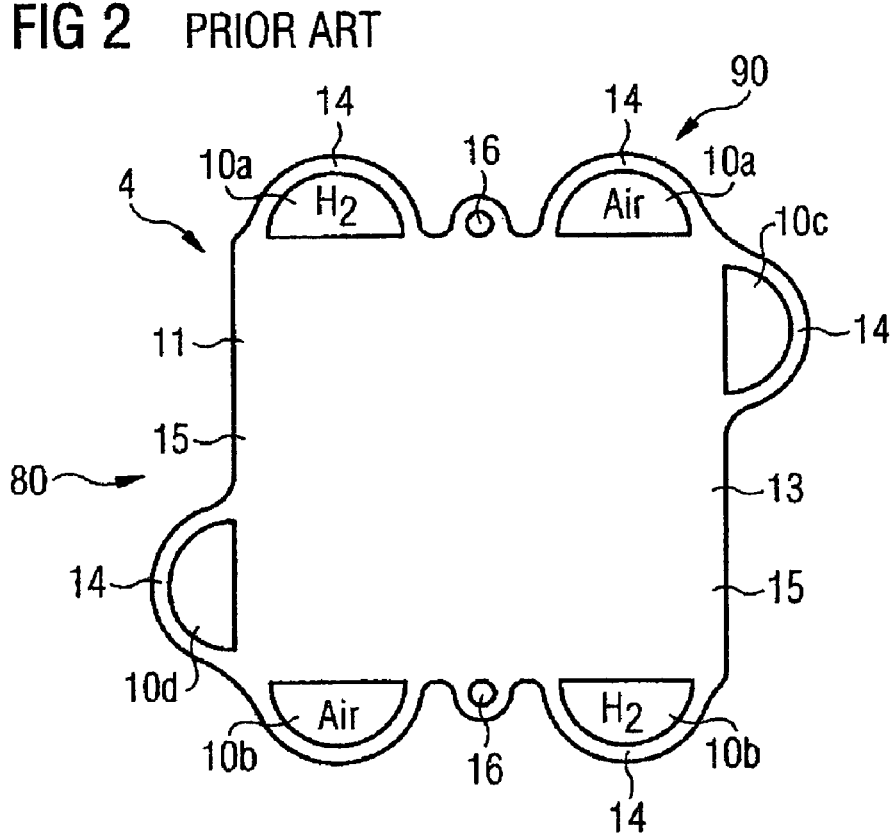
FIG. 2 depicts a cross-section through the stack in FIG. 1 in schematic form, with laterally routed fluid channels.

For clarity purposes, the collection channels 10a and 10b (running along the lateral surfaces 80, 90 of the stack 1 for supplying (channels 10a) and discharging (channels 10b) fluid in the stack 1 are depicted in FIG. 2. They run along the sides of the stack and are connected with each of the fuel cells of the stack 1 via the respective channels 7a and 7b of the fuel cells. Preferably the collection channels 10a and 10b are open at one end, e.g. in the case of the first fuel cell of the stack 1, and connected to the fluid supply unit of the stack, while the other end (in the case of the last fuel cell) is blind, i.e. closed. An electrical load 8 is connected to an anode 5 or a cathode 6 via a conductor 9.

FIG. 2 depicts in schematic form a cross-section through the fuel cell stack 1 at the location of a membrane 4. The membrane 4 has a membrane body 13, via which protons are transported. Simultaneously, the membrane 4 has a sealing function at its edges: first of all the edge sections 14 seal off the gas supply channels and discharge channels 10a and 10b which, as mentioned, run along the stack and feed the channels 7a and 7b (FIG. 1). Also shown is the channel 10c for the supply of coolant and a channel 10d for discharge of the coolant, said channels also formed by edge sections 14. Additionally, the membrane 4 has sealing edge sections 15 for the edges of the end or bipolar plates 2a, 2b and 3. The sections 14 and 15 prevent undesired contact of the various media (fuels, coolant and ambient air). Also shown are recesses 16 for tensile elements which hold the fuel cell stack 1 mechanically together. The layout shown in FIGS. 1 and 2 is known in principle to the person skilled in the art.

In operation, the pressure conditions described below prevail in the channels 10a and 10b. Fluid supply (be it hydrogen or ambient air): at the inlet of the respective channel 10a, 10b high dynamic pressure, generated by the fluid pump 1 associated with the stack 1, and correspondingly low static pressure; further back in the channel the dynamic pressure falls and the static pressure increases, until at the end of the channel (at the last fuel cell in stack 1) the dynamic pressure is at its lowest and the static pressure at its highest. The individual cells in the stack are thus fed with different pressures.

The same conditions prevail in the case of fluid discharge: the individual cells feed the respective discharge channel 10a, 10b along its length with the fluids to be discharged, so that toward the outlet of the channel 10a, 10b the dynamic pressure increases and the static pressure decreases.

It is now advantageous to arrange the openings of the channels 10a and 10b at the same end of the stack 1. This configuration is described further in conjunction with FIG. 4.

Figure 3:
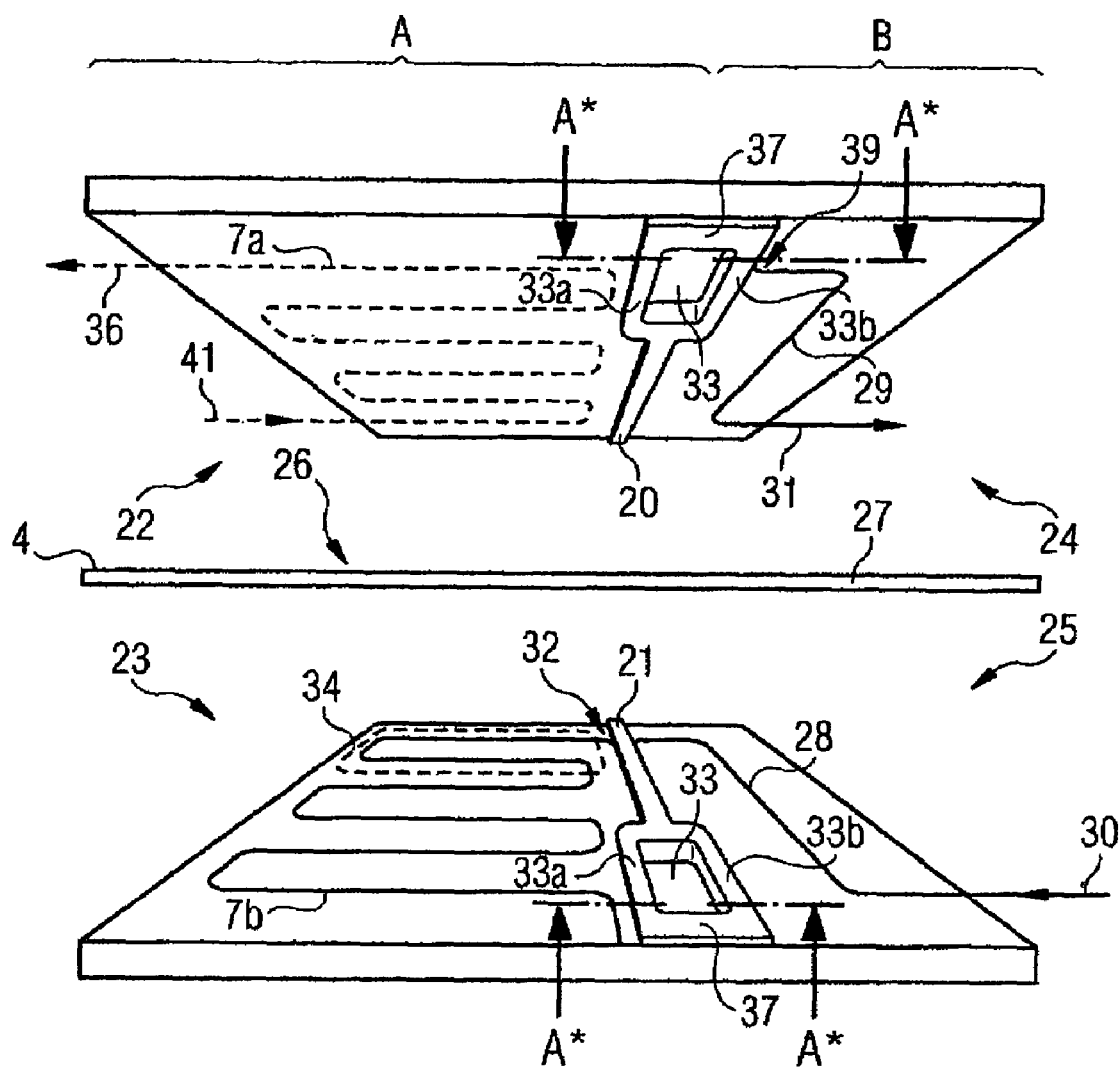
FIG. 3 depicts a fuel cell according to the present invention, in schematic form.

FIG. 3 shows in schematic form an "exploded view" of a fuel cell 1a or 1b according to the present invention.

The cell comprises a section A in which the electrochemical reaction for current generation takes place, and of a section B which is designed as a humidity exchanger; sections A and B are separated from one another by the operationally interacting webs 20 and 21. In turn, section A includes an anode area 22 and a cathode area 23. Section B includes a dehumidifying zone 24 and a humidifying zone 25. The areas 22 and 23 and the zones 24 and 25 are separated from one another by the membrane 4 which extends through the whole cell 1a, 1b (see FIG. 1). The membrane may comprise a variety of materials.

The channels 7a, indicated by broken lines, run in the anode area 22, and hydrogen flows through them in the direction of flow indicated by the arrows 36 and 41, thereby covering the membrane 4 substantially evenly over the corresponding membrane section 26. In the cathode area 23 the channels 7b for even transport of oxygen or ambient air run across the other side of the membrane section 26.

In the humidifying zone 25 ambient air (or oxygen) enters section B of the cell 1a, 1b (arrow 30) via an inflow channel 28. The route of the inflow channel 28 is depicted in simple form so as not to overcomplicate the figure; however, the person skilled in the art will provide a route which is suitable for covering the whole membrane section 27 evenly.

An outflow channel 29 with an outlet at the location of the arrow 31 is shown in the dehumidifying zone 24, once again purely schematically with a simple route in order not to overcomplicate the figure. It is within the scope of the present invention that this and other discussed routes be of different configurations as may result from design choice and/or application requirements.

The humidity exchanger is thus situated in the inflow channel 28 or the inflow line and in the outflow channel 29 or the outflow line for the fluid supplied and discharged on the cathode side.

As mentioned, the sections A and B are separated from one another and sealed against fluid by the webs 20, 21, the membrane 4 also acting as part of the seal. Suitable sealing strategies are known to the person skilled in the art. The inflow channel 28 and the channel 7b of the cathode area 23 are connected via a channel section 32 passing under the web 21. The cathode area 23 and the outflow channel 29 are connected via an inner uptake channel 33 formed by an opening or eye 37 of the webs 20, 21, the connection being shown in more detail in FIG. 4. The uptake channel 33 has side walls 33a and 33b. The membrane 4 has a corresponding opening for the unobstructed passage of the transported gas at the location of the uptake channel 33.

The membrane 4 is, as a polymer electrolyte membrane, pervious to water. Accordingly, in section A $H_3O^{30}$ ions from the anode area 22 can reach the cathode area 23 (via membrane section 26) and in section B water from the dehumidifying zone 24 can reach the humidifying zone 25 (via membrane section 27). Naturally, instead of a single membrane different membranes may be used for section A and for section B respectively, and made of a different material if necessary. The person skilled in the art will select such an arrangement depending on the type of fuel used, the operating temperature and the type of humidifying medium. The use of different membranes lies within the scope of the present invention.

This arrangement allows freshly supplied ambient air from inflow channel 28 to pass membrane section 27, pick up humidity, and then to pass under the web 21 via channel section 32 into channel 7b, where it spreads along the membrane section 26 of the cathode area 23, and because of its increased humidity, prevents the membrane area 34, situated at the inlet of the channels 7b, from drying out. As it continues on along the membrane section 26, the ambient air again picks up the humidity it loses in the membrane area 34, and then passes through the uptake channel 33 into the dehumidifying zone 24 of section B, where in the outflow channel 29 it again loses a considerable part of its humidity, since this penetrates the membrane section 27 and is absorbed on the other side of the membrane 4 by the inflowing air. The required humidity is thus part of a simple circuit and need no longer be regularly supplied from the outside.

In the figure, the inflow and outflow of the fluid in the inflow channel 28 and outflow channel 29 have the same direction of flow, so that consequently the inflowing fluid is increasingly charged with humidity, and the fluid flowing in parallel loses humidity, until both (ideally) have the same humidity (namely half) compared to the original humidity differential. This "half" humidity value cannot be exceeded.

If still more humidity is to be taken up into the inflowing fluid, an inflowing and outflowing fluid can be routed in the reverse flow through section B, with the consequence that the inflowing fluid is exposed on its route to section A to ever higher humidity of the outflowing fluid, since the humidity of the latter is greatest immediately after leaving section A. Though the inflowing fluid picks up more and more humidity on its route to section A, the humidity of the fluid flowing on the other side of the membrane 4 also increases on this route, so that there is no limit on humidity to be transferred, as with parallel flow routing of the fluid. This arrangement is e.g. advantageous if sufficient surface area is available in the humidity exchanger.

FIG. 4 shows a partial cross-section along the line A*-A* of FIG. 3 through a fuel cell stack 1 with three fuel cells n−1, n and n+1. The cells n and n+1 may correspond to the cells 1a and 1b of FIG. 1. The ambient air route is shown out of the cathode area 23 into the outflow channel 29 of the dehumidifying zone 24 with the sealing strategy for separating the various gas routes.

At the end of its route through the cathode area 23, the ambient air passes under the web 21 through a channel 35, formed on the one hand by the side wall 33a of the eye 37 and on the other hand by the surface of the end plate 2a of the adjacent fuel cell (or of the surface of a seal—not shown—between the fuel cells n and n+1 or 1a and 1b). The channel 35 routes the air into the uptake channel 33, through the opening 38 in the membrane 4 and via a further channel 39 via the side wall 33b of the eye 37 into the outflow channel 29.

This arrangement enables the webs 20, 21 to interact along their entire length (including the eye 37) with a sealing effect with the membrane 4, i.e. this rests firmly on the webs 20, 21 and thus the various gases are unproblematically separated and sealed off from one another.

Barriers 40 separate the superposed uptake channels 33 of each fuel cell 1a, 1b and 1c fluid-tight from one another, with the consequence that each fuel cell 1a, 1b, 1c (or section A thereof) has its own humidity exchanger (section B) and the fluids from each fuel cell 1a, 1b and 1c expelled on the cathode side remain unmixed. The route (shown by a broken line) from the channel 35 of one fuel cell to the channel 39 of the other fuel cell is blocked.

The barriers 40 are of significance according to the invention if the fluid supply and discharge channels are connected so that fluid supply or discharge take place from one end of the stack 1 (cell 1a here by way of example). The following pressure conditions then result in the stack 1: as shown in the description of FIG. 2, the static pressure rises continuously in the fluid supply channel 10a or 10b from its entrance at cell 1a and reaches its maximum at the last cell 1c, with the consequence that the individual cells 1a, 1b, 1c are supplied with different, ever higher pressures.

At its outlet each cell 1a to 1c now feeds the fluid discharge channel 10a or 10b, with the highest static pressure prevailing at the location of cell 1c and the lowest at the location of cell 1a.

The following conditions occur in the stack during operation: the pressure level in the fluid supply channel 10a or 10b is generally higher than in the fluid discharge channel 10a or 10b, but the pressures are comparatively low on the supply and discharge side in the case of the first cell in the stack 1 and comparatively high in the case of the last cell. For each cell the pressure differential is the same over the inlet of the inflow channel 28 and the outlet of the outflow channel 29. The same applies for inlet and outlet of the anode area.

Thus the conditions are created whereby in each of the individual cells the same volume flow or mass flow of fuels essentially prevails as a result of the same pressure drop, and thus the intensity of the chemical reaction is the same, meaning that production of current is essentially the same in all cells.

The barriers 40 (FIG. 4) now help to prevent a pressure equalization across the channels 33 in the stack 1. The conditions described above continue to apply.

If the barriers 40 are removed, the pressure is equalized in the channel 33 which is now continuous (but closed at its end), so that in section A of each cell at the inlet of the cathode area a different pressure, rising from the first to the last cell, prevails, but at the outlet of section A (in channel 33) a leveled-out pressure prevails. Un-equal pressure drop over section A for the different cells results in different volume flow or mass flow of fuel, causing the output of the individual cells to differ, which can be undesirable and harmful.

The figure shows a (schematic) routing of the fluid channels on the cathode side such that all channels are routed in the same fuel cell. However, the optimum routing of the channels 7a and 7b may entail the channels 33, 35 and 39 being routed through adjacent fuel cells, which does not exceed the scope of the invention. Inventively significant is the humidity circuit on the cathode side and the fact that preferably with the help of the barriers 40 all cells in the stack 1 contain the same volume flow of fluid on the cathode side from the same collection channels 10a and 10b (the same applies for the fluids on the anode side).

The exemplary embodiments represented in the figures show how fluid entering the cathode area can be humidified, in that the fluid exiting therefrom is dehumidified and this humidity is supplied to the incoming fluid. Analogously, humidity can also be removed from the fluid expelled from the anode area and added to the fluid entering therein. The layout of such a fuel cell is then analogous to that shown in the figures and can be executed by the person skilled in the art with the aid of the present description. Naturally it is also possible to charge fluid supplied both to the cathode area and the anode area with humidity originating from the respective fluid outflow (humidity from the anode area is routed back thereto, and humidity from the cathode area is routed back thereto).

The present invention can by analogy also be applied to direct methanol fuel cells (DMF). Although the drying-out of the membrane is not critical in such fuel cells, since methanol with water is used on the anode side, the ambient air used on the cathode side becomes charged with water recovered in accordance with the invention, so that a larger water loss can be avoided. Higher temperatures are permissible, resulting in increased operational output. Water is not supplied separately.

The principle of the present invention can also be used to remove humidity from the outflowing fluid of the anode area or cathode area of a cell and to supply it to the inflowing fluid of the other in each case, i.e. the cathode area or anode area. For example, pure hydrogen can be recirculated in the anode area (the hydrogen leaving the anode area is returned to the supply line to the anode area, so that all of the hydrogen supplied to the cell participates in the chemical reaction), the hydrogen being dehumidified after leaving the anode area and the humidity gained being added to the fluid entering the cathode area. In this way humidity leaving the anode area enters the cathode area.

The invention being thus described, it will be obvious that the same may be varied in many ways. The variations are not to be regarded as a departure from the spirit and scope of the invention, and all such modifications as would be obvious to one skilled in the art are intended to be included within the scope of the following claims.

We claim:

1. A fuel cell for generating electrical current via an electrochemical process, comprising:
   an electrochemical process area comprising a cathode area, an anode area and substantially flat ion-exchanging membrane, said cathode area and said anode area being separated from each other by the ion-exchanging membrane, wherein said cathode area comprises a gas passage way having a gas inlet, a gas channel and a gas outlet, wherein said gas passage way is configured for an oxygen-containing gas to flow from the gas inlet through the gas channel to the gas outlet, wherein an oxygen-content of the oxygen-containing gas decreases and a humidity content of the oxygen-containing gas increases due to the electrochemical process taking place in the electrochemical process area; and
   a humidity transfer area comprising a dehumidifying zone, a humidifying zone and a substantially flat humidity transfer membrane, said dehumidifying zone and said humidifying zone being separated from each other by the humidity transfer membrane, which is configured to be gas tight and pervious to humidity;
   wherein the gas outlet is connected via an exhaust channel to the dehumidifying zone and the gas inlet is connected via an inlet channel to the humidifying zone,
   wherein humidity is extracted from the oxygen-containing gas in the dehumidifying zone,
   wherein the extracted humidity is added to the oxygen-containing gas in the humidifying zone by transferring the extracted humidity over the humidity transfer membrane from the dehumidifying zone to the humidifying zone; and
   wherein the ion-exchanging membrane and the humidity transfer membrane are oriented substantially parallel to each other and are arranged to share a common plane.

2. The fuel cell according to claim 1, wherein the fuel cell comprises a plurality of individual fuel cells that are combined to form a fuel cell stack.

3. The fuel cell according to claim 2, wherein the individual fuel cells share at least one of the exhaust channel and the inlet channel.

4. A fuel cell for generating electrical current via an electrochemical process, comprising:
   an electrochemical process area comprising a cathode area, an anode area and a substantially flat ion-exchanging membrane, said cathode area and said anode area being separated from each other by the ion-exchanging membrane, wherein said cathode area comprises a gas passage way having a gas inlet, a gas channel and a gas outlet, wherein said gas passage way is configured for an oxygen-containing gas to flow from the gas inlet through the gas channel to the gas outlet, wherein an oxygen-content of the oxygen-containing gas decreases and a humidity content of the oxygen-containing gas increases due to the electrochemical process taking place in the electrochemical process area;
   a humidity transfer area comprising a dehumidifying zone, a humidifying zone and a substantially flat humidity transfer membrane, said dehumidifying zone and said humidifying zone being separated from each other by the humidity transfer membrane, which is configured to be gas tight and pervious to humidity: and
   a sealing member configured to seal the anode area against the dehumidifying zone;
   wherein the gas outlet is connected via an exhaust channel to the dehumidifying zone and the gas inlet is connected via an inlet channel to the humidifying zone,
   wherein humidity is extracted from the oxygen-containing gas in the dehumidifying zone,
   wherein the extracted humidity is added to the oxygen-containing gas in the humidifying zone by transferring the extracted humidity over the humidity transfer membrane from the dehumidifying zone to the humidifying zone; and wherein the sealing member has a first gas duct forming the exhaust channel and a second gas duct forming the inlet channel.

5. A fuel cell for generating electrical current via an electrochemical process, comprising:

an electrochemical process area comprising a cathode area, an anode area and a substantially flat ion-exchanging membrane, said cathode area and said anode area being separated from each other by the ion-exchanging membrane, wherein said cathode area comprises a gas passage way having a gas inlet, a gas channel and a gas outlet, wherein said gas passage way is configured for an oxygen-containing gas to flow from the gas inlet through the gas channel to the gas outlet, wherein an oxygen-content of the oxygen-containing gas decreases and a humidity content of the oxygen-containing gas increases due to the electrochemical process taking place in the electrochemical process area; and a humidity transfer area comprising a dehumidifying zone, a humidifying zone and a substantially flat humidity transfer membrane, said dehumidifying zone and said humidifying zone being separated from each other by the humidity transfer membrane, which is configured to be gas tight and pervious to humidity;

wherein the gas outlet is connected via an exhaust channel to the dehumidifying zone and the gas inlet is connected via an inlet channel to the humidifying zone, wherein humidity is extracted from the oxygen-containing gas in the dehumidifying zone, wherein the extracted humidity is added to the oxygen-containing gas in the humidifying zone by transferring the extracted humidity over the humidity transfer membrane from the dehumidifying zone to the humidifying zone, wherein the same materials are used for the ion-exchanging membrane and the humidity transfer membrane, wherein the ion-exchanging membrane and the humidity transfer membrane combine to form different portions of a single membrane, and wherein either the exhaust channel or the inlet channel cuts through the single membrane.

6. A method of operating a fuel cell for generating electrical current via an electrochemical process, the fuel cell comprising an electrochemical process area having a cathode area, an anode area and a substantially flat ion-exchanging membrane, said cathode area and said anode area being separated from each other by the ion-exchanging membrane, wherein said cathode area comprises a gas passage way having a gas inlet, a gas channel and a gas outlet, wherein said gas passage way is configured for an oxygen-containing gas to flow from the gas inlet through the gas channel to the gas outlet, wherein an oxygen-content of the oxygen-containing gas decreases and a humidity content of the oxygen-containing gas increases due to the electrochemical process taking place in the electrochemical process area; and a humidity transfer area comprising a dehumidifying zone, a humidifying zone and a substantially flat humidity transfer membrane, said dehumidifying zone and said humidifying zone being separated from each other by the humidity transfer membrane, which is configured to be gas tight and pervious to humidity, the method comprising:

connecting the gas outlet via an exhaust channel to the dehumidifying zone;

connecting the gas inlet via an inlet channel to the humidifying zone, extracting in the dehumidifying zone humidity from the oxygen-containing gas, charging in the humidifying zone the extracted humidity to the oxygen-containing gas by transferring the extracted humidity over the humidity transfer membrane from the dehumidifying zone to the humidifying zone, orienting the ion-exchanging membrane and the humidity transfer membrane substantially parallel to each other, and arranging the ion-exchanging membrane and the humidity transfer membrane to share a common plane.

7. A method of operating a fuel cell for generating electrical current via an electrochemical process, the fuel cell comprising an electrochemical process area having a cathode area, an anode area and a substantially flat ion-exchanging membrane, said cathode area and said anode area being separated from each other by the ion-exchanging membrane, wherein said cathode area comprises a gas passage way having a gas inlet, a gas channel and a gas outlet, wherein said gas passage way is configured for an oxygen-containing gas to flow from the gas inlet through the gas channel to the gas outlet, wherein an oxygen-content of the oxygen-containing gas decreases and a humidity content of the oxygen-containing gas increases due to the electrochemical process taking place in the electrochemical process area; and a humidity transfer area comprising a dehumidifying zone, a humidifying zone and a substantially flat humidity transfer membrane, said dehumidifying zone and said humidifying zone being separated from each other by the humidity transfer membrane, which is configured to be gas tight and pervious to humidity, the method comprising:

connecting the gas outlet via an exhaust channel to the dehumidifying zone;

connecting the gas inlet via an inlet channel to the humidifying zone, extracting in the dehumidifying zone humidity from the oxygen-containing gas, charging in the humidifying zone the extracted humidity to the oxygen-containing gas by transferring the extracted humidity over the humidity transfer membrane from the dehumidifying zone to the humidifying zone, and providing a sealing member configured to seal the anode area against the dehumidifying zone and to provide a first gas duct forming the exhaust channel and a second gas duct forming the inlet channel.

8. A method of operating a fuel cell for generating electrical current via an electrochemical process, the fuel cell comprising an electrochemical process area having a cathode area, an anode area and a substantially flat ion-exchanging membrane, said cathode area and said anode area being separated from each other by the ion-exchanging membrane, wherein said cathode area comprises a gas passage way having a gas inlet, a gas channel and a gas outlet, wherein said gas passage way is configured for an oxygen-containing gas to flow from the gas inlet through the gas channel to the gas outlet, wherein an oxygen-content of the oxygen-containing gas decreases and a humidity content of the oxygen-containing gas increases due to the electrochemical process taking place in the electrochemical process area; and a humidity transfer area comprising a dehumidifying zone, a humidifying zone and a substantially flat humidity transfer membrane, said dehumidifying zone and said humidifying zone being separated from each other by the humidity transfer membrane, which is configured to be gas tight and pervious to humidity, the method comprising:

connecting the gas outlet via an exhaust channel to the dehumidifying zone;
connecting the gas inlet via an inlet channel to the humidifying zone,
extracting in the dehumidifying zone humidity from the oxygen-containing gas,
charging in the humidifying zone the extracted humidity to the oxygen-containing gas by transferring the extracted humidity over the humidity transfer membrane from the dehumidifying zone to the humidifying zone, using same materials for the substantially flat ion-exchanging membrane and the substantially flat humidity transfer membrane,
combining the ion-exchanging membrane and the humidity transfer membrane to form different portions of a single membrane, and
cutting through the single membrane with either the exhaust channel or the inlet channel.

* * * * *